United States Patent
Xu (10) Patent No.: US 11,751,594 B2
(45) Date of Patent: Sep. 12, 2023

(54) FOOD THICKENER COMPOSITION AND METHOD

(71) Applicant: Grain Processing Corporation, Muscatine, IA (US)

(72) Inventor: Jianteng Xu, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 98 days.

(21) Appl. No.: 17/500,223

(22) Filed: Oct. 13, 2021

(65) Prior Publication Data

US 2022/0125089 A1  Apr. 28, 2022

Related U.S. Application Data

(60) Provisional application No. 63/104,012, filed on Oct. 22, 2020.

(51) Int. Cl.
 *A23L 29/269* (2016.01)
 *A23L 29/206* (2016.01)

(52) U.S. Cl.
 CPC ........... *A23L 29/272* (2016.08); *A23L 29/206* (2016.08)

(58) Field of Classification Search
 CPC .............................. A23L 29/272; A23L 29/206
 USPC ....................................................... 426/658
 See application file for complete search history.

(56) References Cited

U.S. PATENT DOCUMENTS

| | | | |
|---|---|---|---|
| 2,440,365 A | 4/1948 | Copping |
| 3,201,317 A | 8/1965 | Miller |
| 3,750,908 A | 8/1973 | Acuff |
| 3,773,752 A | 11/1973 | Buchanan |
| 3,851,798 A | 12/1974 | Miller |
| 3,949,104 A | 4/1976 | Cheng |
| 3,949,903 A | 4/1976 | Benasutti |
| 4,042,151 A | 8/1977 | Uttech |
| 4,105,461 A | 8/1978 | Racciato |
| 4,107,343 A | 8/1978 | Petricca |
| 4,132,793 A | 1/1979 | Haber |
| 4,135,979 A | 1/1979 | Corley |

(Continued)

FOREIGN PATENT DOCUMENTS

| CA | 2254560 | 9/1999 |
|---|---|---|
| CA | 2574247 | 7/2007 |

(Continued)

OTHER PUBLICATIONS

International Search Report and Written Opinion for International Patent Application No. PCT/US2021/054942 dated Feb. 3, 2022.

(Continued)

*Primary Examiner* — Brent T O'Hern
(74) *Attorney, Agent, or Firm* — Fitch, Even, Tabin & Flannery LLP (57) ABSTRACT

Liquid thickener compositions are provided. The compositions may be used to thicken foods and other products. The compositions include at least one gum or thickener and one or more hydration or swelling inhibitors. The inhibitors decrease the viscosity of the concentrated thickener composition, but then permit the composition to function as a thickener upon dilution. Such compositions may provide for thickener compositions that are readily flowable and that require decreased mixing compared to other thickener compositions.

19 Claims, 3 Drawing Sheets

(56) References Cited

U.S. PATENT DOCUMENTS

| | | |
|---|---|---|
| 4,229,825 A | 10/1980 | Guidoux |
| 4,236,820 A | 12/1980 | Walker |
| 4,252,835 A | 2/1981 | Maerker |
| 4,265,858 A | 5/1981 | Crum |
| 4,269,974 A | 5/1981 | Wintersdorff |
| 4,299,825 A | 11/1981 | Lee |
| 4,336,145 A | 6/1982 | Briscoe |
| 4,394,399 A | 7/1983 | Keyser |
| 4,427,681 A | 1/1984 | Munshi |
| 4,430,349 A | 2/1984 | Malone |
| 4,491,483 A | 1/1985 | Dudacek |
| 4,503,084 A | 3/1985 | Baird et al. |
| 4,563,366 A | 1/1986 | Baird |
| 4,620,932 A | 11/1986 | Howery |
| 4,654,086 A | 3/1987 | Baird |
| 4,670,550 A | 6/1987 | Bleeker |
| 4,671,966 A | 6/1987 | Giddey |
| 4,689,219 A | 8/1987 | Sugden |
| 4,708,266 A | 11/1987 | Rudick |
| 4,774,093 A | 9/1988 | Provonchee |
| 4,828,724 A | 5/1989 | Davidson |
| 4,846,934 A | 7/1989 | Carberry |
| 4,855,156 A | 8/1989 | Singer |
| 4,859,484 A | 8/1989 | Bielskis |
| 4,894,335 A | 1/1990 | Peignier |
| 4,938,387 A | 7/1990 | Kervefors |
| 4,980,193 A | 12/1990 | Tuason, Jr. |
| 4,996,070 A | 2/1991 | Nafisi-Movaghar |
| 4,997,571 A | 3/1991 | Roensch |
| 5,118,513 A | 6/1992 | Mehansho |
| 5,165,946 A | 11/1992 | Taylor |
| 5,202,146 A | 4/1993 | Singer |
| 5,251,699 A | 10/1993 | Lau |
| 5,270,459 A | 12/1993 | Shatzman |
| 5,300,302 A | 4/1994 | Tachon |
| 5,302,292 A | 4/1994 | Soeder |
| 5,306,519 A | 4/1994 | Peterson et al. |
| 5,338,561 A | 8/1994 | Campbell |
| 5,362,713 A | 11/1994 | Westland |
| 5,385,748 A | 1/1995 | Bunger |
| 5,413,804 A | 5/1995 | Rhodes |
| 5,445,195 A | 8/1995 | Kim |
| 5,466,464 A | 11/1995 | Masaki |
| 5,536,825 A | 7/1996 | Yeh |
| 5,538,751 A | 7/1996 | Carter |
| 5,597,604 A | 1/1997 | Chalupa |
| 5,607,714 A | 3/1997 | Connolly |
| 5,633,028 A | 5/1997 | Wong |
| 5,641,532 A | 6/1997 | Pflaumer |
| 5,648,093 A | 7/1997 | Gole |
| 5,654,027 A | 8/1997 | Chalupa |
| 5,811,148 A | 9/1998 | Chiu |
| 5,816,446 A | 10/1998 | Steindorf |
| 5,837,272 A | 11/1998 | Fierro, Jr. |
| 5,869,029 A | 2/1999 | Graff-Andersen |
| 5,869,118 A | 2/1999 | Morris |
| 5,919,512 A | 7/1999 | Montezinos |
| 5,932,235 A | 8/1999 | Ninomiya |
| 5,976,084 A | 11/1999 | Tymchuck |
| 5,985,339 A | 11/1999 | Kamarei |
| 5,997,907 A | 12/1999 | Goswami |
| 6,001,408 A | 12/1999 | Dudacek |
| 6,007,848 A | 12/1999 | Hendrick |
| 6,010,032 A | 1/2000 | Vermylen |
| 6,013,294 A | 1/2000 | Bunke |
| 6,022,576 A | 2/2000 | Cirigliano |
| 6,029,857 A | 2/2000 | Keller |
| 6,033,712 A | 3/2000 | Greenshields |
| 6,033,713 A | 3/2000 | Sheldon |
| 6,036,982 A | 3/2000 | Lehmberg |
| 6,036,986 A | 3/2000 | Cirigliano |
| 6,056,984 A | 5/2000 | Ekanayake |
| 6,077,501 A | 6/2000 | Sickora |
| 6,139,895 A | 10/2000 | Zablocki |
| 6,149,962 A | 11/2000 | Loh |
| 6,162,471 A | 12/2000 | Sheldon |
| 6,174,549 B1 | 1/2001 | Greenshields |
| 6,200,623 B1 | 3/2001 | Dudacek |
| 6,214,406 B1 | 4/2001 | Reimerdes |
| 6,277,395 B1 | 8/2001 | Fukui |
| 6,303,039 B1 | 10/2001 | Back |
| 6,326,040 B1 | 12/2001 | Kearney |
| 6,423,348 B1 | 7/2002 | Mickus |
| 6,455,090 B1 | 9/2002 | Uzuhashi et al. |
| 6,458,395 B1 | 10/2002 | Emoto |
| 6,461,589 B2 | 10/2002 | Robbins |
| 6,559,187 B2 | 5/2003 | Chandran |
| 6,613,400 B1 | 9/2003 | Murphy |
| 6,686,341 B1 | 2/2004 | Bijlsma |
| 6,693,216 B2 | 2/2004 | Raczek |
| 6,759,073 B2 | 7/2004 | Heisey |
| 7,052,725 B2 | 5/2006 | Chang |
| RE39,125 E | 6/2006 | Fukui et al. |
| 7,288,277 B2 | 10/2007 | Zhao |
| 7,320,810 B2 | 1/2008 | Wuersch |
| 7,429,326 B2 | 9/2008 | Levy |
| 7,638,150 B2 | 12/2009 | Holahan |
| 7,764,992 B2 | 7/2010 | Mabary |
| 8,445,044 B2 | 5/2013 | Stetzer |
| 9,414,615 B2 | 8/2016 | Sridhar |
| RE47,448 E | 6/2019 | Stetzer |
| RE48,607 E | 6/2021 | Stetzer |
| 2001/0036439 A1 | 11/2001 | Robbins |
| 2002/0031525 A1 | 3/2002 | Kobzeff |
| 2003/0044351 A1 | 3/2003 | Robbins |
| 2003/0211204 A1 | 11/2003 | Fields |
| 2004/0197456 A1 | 10/2004 | Holahan |
| 2004/0228954 A1 | 11/2004 | Tejayadi |
| 2004/0258823 A1 | 12/2004 | Dufresne |
| 2005/0211768 A1 | 9/2005 | Stillman |
| 2006/0051296 A1 | 3/2006 | Holahan |
| 2006/0207925 A1 | 9/2006 | Levy |
| 2007/0020358 A1 | 1/2007 | Mower |
| 2007/0042094 A1 | 2/2007 | Warf |
| 2007/0138093 A1 | 6/2007 | Bossler |
| 2007/0172568 A1 | 7/2007 | Spelman |
| 2007/0196495 A1 | 8/2007 | Soltero |
| 2007/0224126 A1 | 9/2007 | Dufresne |
| 2007/0264401 A1 | 11/2007 | Taormina |
| 2008/0223799 A1 | 9/2008 | Tsai |
| 2008/0226800 A1 | 9/2008 | Lee |
| 2008/0248184 A1 | 10/2008 | Esteve |
| 2009/0074940 A1 | 3/2009 | Sliwinski |
| 2009/0162515 A1 | 6/2009 | Dufresne |
| 2009/0291192 A1 | 11/2009 | Holahan |
| 2010/0055207 A1 | 3/2010 | Holahan |
| 2010/0055262 A1 | 3/2010 | Holahan |
| 2010/0119559 A1 | 5/2010 | Dansereau |
| 2010/0166917 A1 | 7/2010 | Smith |
| 2010/0178397 A1 | 7/2010 | Douglas |
| 2010/0215804 A1 | 8/2010 | Goto |
| 2010/0233320 A1 | 9/2010 | Sunvold |
| 2011/0135568 A1 | 6/2011 | Holahan |
| 2011/0135799 A1 | 6/2011 | Holahan |
| 2013/0059059 A1 | 3/2013 | Tristram |
| 2013/0065959 A1* | 3/2013 | Ho .................. A23B 4/20 514/557 |
| 2013/0236625 A1 | 9/2013 | Stetzer |
| 2014/0272003 A1 | 9/2014 | Stetzer |
| 2018/0332873 A1 | 11/2018 | Stetzer |

FOREIGN PATENT DOCUMENTS

| | | |
|---|---|---|
| DE | 19918210 | 11/2000 |
| EP | 0130771 | 1/1985 |
| EP | 0620012 | 10/1994 |
| EP | 1046347 | 10/2000 |
| EP | 1078981 | 2/2001 |
| EP | 1810579 | 7/2007 |
| JP | 06040950 | 2/1994 |
| JP | 07274915 | 10/1995 |
| JP | 10131478 | 5/1998 |
| JP | 10229517 | 7/1998 |
| JP | 11187827 | 7/1999 |

(56) References Cited

FOREIGN PATENT DOCUMENTS

| | | |
|---|---|---|
| JP | 11124342 | 11/1999 |
| JP | 11318356 | 11/1999 |
| JP | 2000041594 | 2/2000 |
| JP | 2000135070 | 5/2000 |
| JP | 2000325041 | 11/2000 |
| JP | 2003002901 | 1/2003 |
| JP | 2016208895 | 12/2016 |
| WO | 9925208 | 5/1999 |
| WO | 9934690 | 7/1999 |
| WO | 0057727 | 10/2000 |
| WO | 0115743 | 3/2001 |
| WO | 0179521 | 10/2001 |
| WO | 0211716 | 2/2002 |
| WO | 0226264 | 4/2002 |
| WO | 0243509 | 6/2002 |
| WO | 03011051 | 2/2003 |
| WO | 2004069179 | 8/2004 |
| WO | 2006054886 | 5/2006 |
| WO | 2006065136 | 6/2006 |
| WO | 2008137181 | 11/2008 |
| WO | 2011028286 A1 | 3/2011 |
| WO | 2011140598 A1 | 11/2011 |
| WO | 2012097918 A1 | 7/2012 |
| WO | 2017002722 | 1/2017 |
| WO | 2018045419 | 3/2018 |
| WO | 2019165506 A1 | 9/2019 |

OTHER PUBLICATIONS

Reinagel M et al., "Is Mineral Water Good For You?" (posted Jul. 2, 2010).
NPL "Honey Density" retrieved on May 21, 2014.
NPL Xanthan retrieved on May 22, 2014.
Kuntz, Lynn A., "Special Effects with Gums," Food Product Design, Dec. 1, 1999, 17 pages.
Nussinovitch, A., "Xanthan gum," Hydrocolloid Application, (1997), pp. 154-168.
Cinogel Biotech, "High Acyl Gellan Gum VS Low Acyl Gellan Gum," https://www.cinogel.com/p/high-acyl-gellan-gum-vs-low-acyl-gellan.html, Jun. 22, 2020.
DP Kelco U.S., Inc., Kelcogel Gellan Gum Book, 5th Edition, bearing a copyright date of 2001-2008.
Simplythick, LLC, EasyMix, How to Use Demo Video, https://www.simplythick.com/How-to-Use-Videos, Mar. 29, 2018.
Abstract; Research Disclosure, XP-002305761; "Concentrated Gellan Gum Gel (5%) Suitable to Gel Various Other Systems"; King, A.H.; 1996 (1 page total).
American College of Radiology; ACR Appropriateness Criteria; "Imaging Recommendations for Patients with Dysphagia"; p. 225-230 (6 pages total), 2000.
American Speech-Language Hearing Association; "Communication Facts, Special Populations: Dysphagia"; 1999 Edition (3 pages total).
American Speech-Language Hearing Association; "Communication Facts, Special Populations: Dysphagia"; 2001 Edition http://orofessional.asha.ora/research/dvsohaaia.htm (6 pages total).
American Speech-Language Hearing Association; "Special Populations: Stroke"; 2001 Edition; http://professional.asha.org/research/dysphagia.htm (6 pgs.).
Applied microbiology and biotechnology, Aug. 1998, vol. 50, No. 2, "Xanthan gum biosynthesis and application:a biochemical/genetic perspective", A. Becker a F. Katzen a A. PuE hler a L. Ielpi, p. 145-152 (8 pgs.).
Arch Neurol—vol. 42, Jan. 1985; "Dysphagia in Huntington's Disease"; Norman A. Leopold, DO, Marion C. Kagel, MA; p. 57-60 (4 pages total).
Art. 94(3) EPC Communication, European Application No. 027596246.8, dated Apr. 16, 2008, (6 pgs.).
Art. 94(3) EPC Communication, European Application No. 04707165.9, dated Apr. 7, 2008, (5 pgs.).
Art. 96(2) EPC Communication, European Application No. 027596246.8, dated Apr. 10, 2007, (5 pgs.).
Art. 96(2) EPC Communication, European Application No. 027596246.8, dated Nov. 13, 2007, (3 pgs.).
Art. 96(2) EPC Communication, European Application No. 04707165.9, dated Aug. 7, 2006, (5 pgs.).
Australian Examiner's report No. 5 on patent application No. 2002324592 dated Apr. 30, 2008 (3 pgs.).
Australian Examiner's report No. 6 on patent application No. 2002324592 dated Jun. 5, 2008 (3 pgs.).
Buckley, John E et al., "Feeding Patients with Dysphagia." Nursing Forum, vol. XV, No. 1 (1976), pp. 69-85.
Canadian Examiner's Notice of Allowance on patent application No. 2459924 dated Feb. 23, 2009 (1 pg.).
Canadian Examiner's Notice of Allowance on patent application No. 2509715 dated Oct. 26, 2009 (1 pg).
Canadian Examiner's Requisition on patent application No. 2459924 dated Apr. 22, 2008 (5 pgs.).
Canadian Examiner's Requisition on patent application No. 2459924 dated Apr. 3, 2006 (4 pgs).
Canadian Examiner's Requisition on patent application No. 2459924 dated Jul. 21, 2005 (4 pgs.).
Canadian Examiner's Requisition on patent application No. 2459924 dated Nov. 29, 2006 (4 pgs.).
Canadian Examiner's Requisition on patent application No. 2459924 dated Sep. 7, 2007 (3 pgs.).
Canadian Examiner's requisition on patent application No. 2509715 dated Feb. 19, 2009 (3 pgs.).
Castellanos, V. H., Phd, RD; Butler, E. RD; Gluch, L., RD; Burke; B.; RD, Use of Thickened Liquids in Skilled Nursing Facilities, Jrnl of the Amer Dietetic Association Aug. 2004.
Compiled by a Castrogiovanni, Communication Facts: Special Populations: Dysphagis BO 2002 Edition, ASHA Resource Center, htlp:llprofessional.asha.orgIresearchldysphagia.html (3 pgs.).
Decision to Grant EPC Communication, European Application No. 04707165.9, dated Dec. 30, 2008, (2 pgs.).
Deis, Ronald C., Ph.D., Dietary Fiber: A Healthy Discussion, Weeks Publishing Co, Jan. 1999, Design Elements Online, http://www.foodoroductdesian.com/archive/1990/0199de.html.
Department of Health and Human Services, FDA; 21 CFR Part 201, Regulation of Medical Foods: Advance Notice of Proposed Rulemaking Federal Redister vol. 61., Aug. 2, 1993.
Department of Health and Human Services; Food & Drug Administration; Warning Statements Required for Over-The-Counter Drugs Containing Water-Soluble Gums as Active Ingredients Federal Register; vol. 58, No. 164; Thursday, Aug. 26, 1993/Rules and Regulations (8 pages total).
Dietary Fiber Definition Committee, "The definition of dietary fibre", Cereal Foods World, 46, pp. 112-126, Mar. 2001.
Dysphagia 9:209-217; "Epidemiology and Dysphagia"; Keith V. Kuhlemeier, PhD, MPH; 1994; p. 209-217 (9 pages total).
Edmonds, C., M.R.C.P.D.P.M., Huntington'S Cora, Dysphagia and Death, The Medical Journal of Australia, Aug. 6, 1966.
English Translation of Published Japanese Patent Application No. JP11187827A (16 pgs.).
European Patent Office, European Search Report, dated Mar. 9, 2011, pp. 1-57.
European Search Report, European Application No. 027596246.8, dated Aug. 12, 2004, (3 pgs.).
European Search Report, European Application No. 04707165.9, dated Jan. 27, 2006, (4 pgs.).
European Search Report, European Application No. 09005203.6, dated Jun. 16, 2009, (5 pgs.).
Ikegami, S. et al., "Effect of viscous indigestible polysacchardes on pancreatic-biliary secretion and digestive organs in rats", Journal of Nutrition, 120, pp. 353-360, 1990.
Intent to Grant EPC Communication, European Application No. 02759246.8, dated Apr. 27, 2009, (32 pgs.).
Intent to Grant EPC Communication, European Application No. 04707165.9, dated Jul. 28, 2008, (33 pgs.).
International Search Report 02759246.8-1221-US02/24525 P71214EPOO 4 pages, Dec. 8, 2004.

(56) References Cited

OTHER PUBLICATIONS

Jenkins, D.JA et al., "Dietary fibres, fibre analogues, and glucose tolerance: importance of viscosity", British Medical Journal, 1, pp. 1392-1394, May 27, 1978.

Jenkins; D.JA et al., "Unabsorbable carbohydrates and diabetes: decreased post-prandial hyperalycaemia", The Lancet, 308, pp. 172-174, Jul. 24, 1976.

Journal of Neuroscience Nursing, Apr. 1989, vol. 21, No. 2; "Dysphagia in Huntington's Disease"; Vicki P. Hunt, RN, Francis O. Walker, MD; p. 92-95 (4 pages total).

Li, Meijing et al., "Viscosity Measurements of Barium Sulfate Mixtures for Use in Motility Studies of the Pharynx and Esophagus." Dysphagia 7 (1992), pp. 17-30.

Lontong, V.; Texture and Flavor Characteristics of Beverages Containing Commercial Thickening Agents for Dysphagia Diets, Journal of Food Science, vol. 68, Nov. 4, 2003 1537-1541.

NYEEI: Otolaryngology: Faqs About Swallowing Disorders, Online, NYEEI: http://www.nyee.edu/faqlist.html?tablename=faz&key=48&print=, 1999.

PCT Notfcation of Transmittal of the International Seach Report or the Declaration, International Applicaton No. PCT/US02/24525, dated Dec. 2, 2002; 6 pages.

PCT Notifcaton of Tansmittal of International Preliminary Examination Report, International Applicaion No. PCT US02/24525, dated Aug. 23, 2004; (5 pgs.).

Reppas, C. et al., "High viscosity hydroxypropylmethylcellulose reduces postprandial blood glucose concentrations in NIDDM patients", Diabetes Research and Clinical Practice, 22, pp. 61-69, 1993.

Siddall, Pauline M et al., "Dysphagia in the elderly: a learning experience forthose new to this field." Caring to Communicate. International Journal of Language and Communication Disorders, vol. 30, Issue S1 (Oct. 1995), pp. 423-432.

Sopade et al., Moisture absorption characteristics of food thickeners used for the management of swallowing dysfunctions, Eur. Food Res. Technol., 2007, 555-560, 224, Springer Verlag, United States.

Torsdottir, I. et al., "A small dose of soluble alginate-fiber affects postprandial glycemia and gastric emptying in humans with diabetes", Journal of Nutrition, 121, pp. 795-799, 1991.

U.S. Food and Drug Administration Center for Food Safety and Applied Nutrition [Online] http://www.cfsan.fda.gov/-dms/ds-medfd.html Aug. 24, 2001.

Winstein, Carolee J., "Neurogenic Dysphagia: Frequency, Progression, and Outcome in Adults Following Head Injury." Physical Therapy. vol. 63, No. 12 (Dec. 1983), pp. 1992-1997.

Wolever, T.M.S. et al., Guar gum and reduction of post prandial glycaemia: effect of incorporation into solid food, liuid food, and both, Br. J. Nutr. (1979) 4x, 505.

Written Opinion of the International Searching Authority, International Application No. PCT/US02/24525, dated Feb. 18, 2004; (5 pgs.).

Written Opinion of the International Searching Authority, PCT Application No. PCT/US2008/005905, dated Aug. 6, 2008, 4 pp.

Xanthan gum, G. Sworn, Monsanto (Kelco Biopolymers, Tadworth), in Handbook of Hydrocolloids, ed. G.O. Phillips and P. Williams, Woodhead Publishing Ltd, Cambridge, England, Jul. 2000, pp. 103-115. Available at: http://docencia.izt.uam.mx/epa/quim.sub.--alim/tareas/xantana.pdf.

\* cited by examiner

FOOD THICKENER COMPOSITION AND METHOD

TECHNICAL FIELD

This application relates to thickener compositions and more particularly, liquid food thickener compositions.

BACKGROUND

Beverages and consumable liquids are often thickened to impart a characteristic mouthfeel or to suit specific consumer groups. For example, people with dysphagia typically need to have liquids thickened to aid in swallowing.

Food thickeners, such as gums and starches, are oftentimes used as ingredients to thicken various types of foods, beverages, and the like. Many conventional food thickeners are in the form of dry powders that are added into aqueous liquids.

Such dry powder food thickeners require additional time and/or steps to properly incorporate the powder into a food product. For example, depending on the specific type of thickener, further processing with heat, shear, or both, is likely necessary to activate the thickener powder in a food, such as a liquid. Upon swelling/hydration, hydrodynamic volume of the thickener molecules increases to occupy the volume of liquid phase. Internal friction of the liquid system increases from either coil entanglement of molecules or compression among swollen particles and hence, the liquid thickens.

Some thickeners are based on gums. Commercially, dispersing powder-form food gums can be troublesome and can require special equipment to provide adequate shear, in cases of cold water soluble thickeners, and heating/cooling devices, in cook-up thickeners. Special pumps and vacuum-generating equipment can be necessary to move the thickened mixture and remove entrapped air bubbles. Approaches to mitigate this problem have included agglomeration, used to improve bulkiness of a thickener and ease of water penetration. Mixing gum powder and co-spray drying with an inert carrier is also widely used. However, these processes not only add costs to final users, but more importantly, do not fully resolve gum hydration problems.

One notable problem with powder thickeners is the development of "fisheyes." This happens when the outside surface of the powdered thickener hydrates quickly while the inside remains solid. This can result in inadequate thickening as well as an undesirable appearance of the food product. Further, it is still oftentimes necessary to vigorously stir and create shear. For a user, particularly an older person, this might be inconvenient or difficult.

It is known that pre-dispersing food gums in a dispersant and then adding water can effectively prevent issues associated with rapid hydration. Most of those dispersants are organic solvents and are unsuitable for food applications. Additionally, even when in a liquid concentrate form, food thickeners may be too viscous to easily dispense from a container. The concentrated liquid food thickener may also require heat, excess shear, or other extra steps to properly disperse the concentrate in a liquid food product.

In view of these deficiencies with the above-described powdered forms of thickeners as well as existing liquid forms of thickeners, it would be desirable to provide a liquid thickener product that has a low viscosity when concentrated, yet thickens when diluted in an aqueous food product. For food applications, it is particularly desirable for the concentrated product to be able to be quickly and easily dispensed into the food product, and easily incorporated into the food product without excessive stirring, heating, or other time-consuming processing steps.

It has now been found that certain gums and thickeners, when used with hydration or swelling inhibitors as provided hereinbelow, can serve as liquid thickeners in various applications. The compositions include at least one gum or thickener and one or more hydration or swelling inhibitors. The inhibitors decrease the viscosity of the concentrated thickener composition, but permit the composition to function as a thickener upon dilution. Such compositions may provide for thickener compositions that are readily flowable and that require decreased mixing compared to other thickener compositions. Thickened food products and methods for thickening a food product are also within the ambit of the present disclosure, as are methods for preparing a thickened food product. The compositions described herein are useful for non-food applications as described below.

DETAILED DESCRIPTION

Various liquid thickener compositions, such as in the form of concentrates, and their methods of manufacture and use are described herein. Many of the compositions described herein have decreased viscosities when in the concentrated form, yet result in a higher viscosity when used at certain dilutions in an aqueous food. This is believed to result from a synergistic combination of various components that function as viscosity inhibitors when in the concentrated thickener liquid. Even when diluted, the liquid thickener compositions can still be suitable for providing a desired viscosity in the final food product.

The thickener compositions may be in a concentrated form that is a pourable liquid, such as having a light syrup consistency. Upon diluting with any aqueous liquid and without using heat, the diluted concentrate rapidly thickens after a brief hand stirring. Depending on amount of aqueous liquid used, the resulting diluted product can develop a wide array of viscosities, ranging for example from nectar-like to honey-like consistency. Other consistencies may also be developed depending on the final dilutions. The addition of the concentrate may be very clear in appearance and may impart a bland to slight salty taste, depending on the dilution factor, thereby providing versatility for use in beverages and in savory liquid foods such as soups, sauces, and gravies.

The compositions described herein may help with typical problems associated with dissolving conventional powder-form thickeners, such as incomplete and slow hydration, requirements of heat and high shear, clinging to utensils, foaming, and bubbling. In addition, the liquid thickener composition can be sterilized and stabilized through a heat-involved fluid gel creation, rendering the composition free of microbiological spoilage and phase separation for extended periods of time.

The thickener compositions described herein may take a variety of forms and may include various amounts of different types of components. The thickener composition typically is in the form of a liquid concentrate that is pourable or otherwise dispensable directly in a liquid form. The composition may include at least water, one or more food gums, one or more hydration and/or swelling inhibitors, and optionally other ingredients such as one or more preservatives and a buffer system.

Various types of gums, thickeners, and the like may be used in the compositions described herein. When applicable to thickening foods, food approved gums can be used. Such suitable gums may include, but are not limited to thickening gums. Exemplary thickening gums include materials such as xanthan gum, guar gum, locust bean gum, chemically modified cellulosic gums, and the like. Other thickeners, such as gellan gums, carrageenans, alginates, pectins, konjac gums, and the like may also be used. These materials may be used to synergistically create viscosity and/or prevent phase separation. The gums/thickeners may be swelling gums, gelling gums, mixtures thereof, and the like.

The amounts of the gums/thickeners used in the compositions may also vary as desired to provide suitable thickening. For example, the gums may be used in an amount of about 0.5 to about 20 wt. %, in other cases in an amount of about 1 to about 20 wt. %, by total weight of the liquid thickener composition. For instance, the lower range value of the gum may be about 0.5%, about 1%, about 1.5%, about 2%, about 2.5%, about 3%, about 3.5%, about 4%, about 4.5%, or about 5%, and the higher range value of the gum may be about 15%, about 16%, about 17%, about 18%, about 19%, or about 20%, by total weight of the liquid thickener composition. Xanthan gum may be used in the above amounts, such as an amount of about 1 to about 20 wt. %, about 2 to about 20 wt. %, about 5 to about 15 wt. %, and other amounts. The xanthan gum may be used in combination with one or more other gums. For example, about 1 to about 20 wt. % xanthan gum, or about 2 to about 20 wt. % xanthan gum may be used in combination with about 0.001 to about 0.1 wt. % of another gum such as low acyl gellan gum by total weight of the liquid thickener composition. It is believed that a weak fluid gel is created by gellan gum, this gel inhibiting settling of xanthan gum particles. The amount of gellan gum may be less than 0.1 wt. % regardless of the amount of xanthan gum used. An amount of gellan gum higher than 0.1 wt. % is useful but sometimes can result in poor fluidity of the concentrated material.

The composition may also include a buffer system. Such materials include, but are not limited to an edible acid and its conjugate base. The buffer system is primarily a food safety measure. For liquid foods with water activity greater than 0.85, the FDA typically requires the pH to be 4.6 or below to inhibit botulism and other toxic microorganism growth. Citrate, acetate, phosphate, tartrate, lactate, at 0.1-1M strength, are among some most used food buffers. Other buffer systems may also be used.

The compositions may include a preservative to increase shelf life of the compositions. Various preservatives that are suitable for use in food may be included. For example, preservatives such as benzoates, sorbates, propionates, and the like may be used. Exemplary materials may include lactic acid, potassium sorbate, calcium sorbate, sodium sorbate, ascorbic acid, and the like. The preservatives may be used in any desired amount, such as from about 0.2 to about 1 wt. %.

Various hydration and/or swelling inhibitors can be used to delay and inhibit hydration of the gums or thickeners. With presence of certain inhibitors, at certain concentrations, in a liquid phase, gum/thickener particles remain dispersed but insufficiently swollen and therefore, do not develop their full viscosity. Upon dilution, the inhibitors quickly lose their inhibitory ability and allow the gums/thickeners to reach full hydration, thus develop viscosity. This can be used to create syrup-like, water-based liquid thickener concentrates that contain high amounts of gum/thickeners, such as xanthan gum. The liquid thickener concentrate reduces many issues that can occur during powder-liquid mixing processes and can be versatile for consumers.

The inhibitors can include a variety of different types and combinations of components. Such inhibitors can include, but are not limited to salts, such as edible salts, dextrin-like starch hydrolysates, polysaccharides, oligosaccharides, low viscosity polysaccharides, polysaccharide hydrolysates, and the like. Salts may include materials such as, chlorides, lactates, phosphates, sulfates, and the like. Polyvalent metal salts may also be used. In one form, the salts may include, but are not limited to calcium chloride, sodium chloride, magnesium chloride, ferric chloride, aluminum chloride, potassium chloride, calcium lactate, and the like.

The inhibitors can also include various forms of polysaccharides and/or oligosaccharides, such as maltodextrin. These materials may be used in combination with other inhibitors, as many maltodextrins do not exhibit much hydration inhibition for many gums/thickeners. Maltodextrins having various dextrose equivalent (DE) values may be used, with the understanding that these are typically oligosaccharide mixtures of low DE (1-3) and higher DE materials. For example, maltodextrins having a DE value of from about 10 to about 18 may be used. Certain DE values may provide better inhibition properties depending on the gums and thickeners. For example, DE 15 may work especially well with certain gums such as xanthan gum.

As disclosed in U.S. Pat. No. 7,595,393, polysaccharides and/or oligosaccharides, such as maltodextrin, typically are provided as mixtures of saccharides that have various degrees of polymerization (DP), which refers to the number of saccharide monomer units in the molecules. A commercially available maltodextrin, such as MALTRIN® M100 (available from Grain Processing Corporation of Muscatine, Iowa) may be used as provided. Alternatively, the commercially provided maltodextrin may be modified by an enzyme treatment or fractionation to have a reduced amount of low molecular weight components. It is desired to employ a mixture of oligosaccharides having a relatively low amount of DP1 through DP6 components. For example, in a fractionation process a solution of maltodextrin may be passed through a dialysis membrane to partially separate the maltodextrin based on molecular weight, creating a maltodextrin having a DP profile with reduced amounts of DP1 through DP6 saccharides as compared to the starting material. The amount of DP1 through DP6 saccharide components in the resulting maltodextrin may be, for instance, at most about 10%, at most about 9%, at most about 8%, at most about 7%, at most about 6%, at most about 5%, at most about 4%, at most about 3%, or at most about 2% by total saccharide weight on a dry solids basis. A maltodextrin fraction such a DP profile with reduced amounts of DP1 through DP6 has different viscosifying characteristics as well as a desirably low content of sugars, and is suitable for use in the compositions described herein. It is hypothesized that the smaller molecules can "seep" into xanthan coils and potentially cause or contribute to swelling.

The hydration and/or swelling inhibitors may be selected to provide desired inhibition properties, taste profiles, clarity, as well as other properties of the concentrated system and/or the thickened food product when the concentrate has been diluted. The inhibitors may be selected to be more suitable for the specific gum(s).

Some of the hydration and/or swelling inhibitor components provide for little, if any, decrease in the viscosity of the concentrated liquid thickener composition when used on their own. When testing various inhibitor components, such as calcium chloride and maltodextrin individually, each did not show significant hydration inhibition effects. When a thickening hydrocolloid is subjected to an inhibitory effect, the apparent viscosity of the hydrocolloid solution should decrease as a function of the dosage of the inhibitor. Using 2% xanthan gum as an example, addition of maltodextrin (10-50 wt. %) did not inhibit xanthan gum hydration, as shown in FIG. 1, but rather rendered the mixture significantly thicker.

Figure 1:
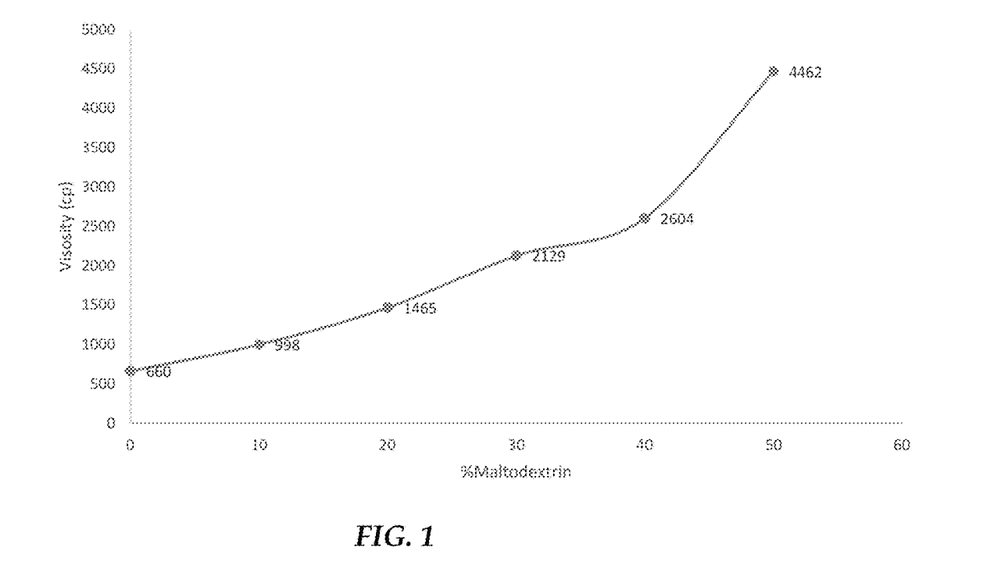
FIG. 1 is a graph of viscosity of 2 wt. % xanthan gum solution with varying maltodextrin content.

More specifically, FIG. 1. is a graph of viscosity of 2% xanthan gum solution with varying maltodextrin content. The DE of the maltodextrin was 15. Each of the compositions was agitated for 30 minutes at 160 rpm, 25° C. in a Rapid Visco Analyzer (RVA) canister before the viscosity was read. As shown in FIG. 1, as the concentration of maltodextrin increased, so did the viscosity. Therefore, it appears that maltodextrin as a lone hydration inhibitor component does not decrease the viscosity.

Figure 2:
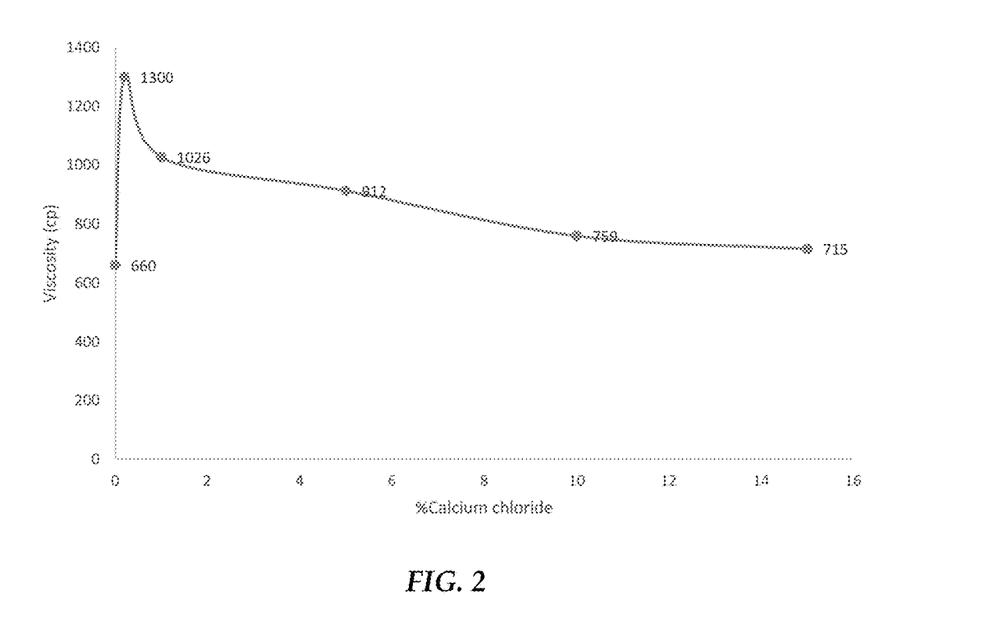
FIG. 2 is a graph of viscosity of 2 wt. % xanthan gum solution with varying calcium chloride content.

Next, the effect of calcium chloride was tested. The viscosity of 2% xanthan gum solution with varying calcium chloride content was tested. The samples were each agitated for 30 minutes at 160 rpm, 25° C. in a Rapid Visco Analyzer (RVA) canister before the viscosity was read. As shown in FIG. 2, the initial viscosity increased, but then started to decrease from the initially increased viscosity. However, even up to 15% calcium chloride, the overall viscosity still was not lower than the initial viscosity of the xanthan gum without any calcium chloride. Although the graph appears to show a trend of decreasing viscosity, calcium chloride, at an amount above about 15%, would likely not be suitable in foods because of its intense saltiness at increased concentrations.

Further tests were performed using varying levels of xanthan gum along with varying levels of calcium chloride. Various compositions were prepared, mixed, and tested as done for the samples in FIG. 2 by agitating for 30 minutes at 160 rpm, 25° C. in a Rapid Visco Analyzer (RVA) canister before the viscosity was read.

As Table 1 below illustrates, at or below about 0.5% xanthan gum concentration, calcium chloride causes a slight decrease in viscosity. At higher gum concentrations, viscosity increases with a small amount of calcium chloride. This phenomenon may help because a small amount of calcium chloride will remain in the dilution to enhance viscosity. Such compositions may be suitable for applications such as a low sodium soup pouch.

TABLE 1

| % Xanthan gum | % $CaCl_2$ | Viscosity (cp) |
|---|---|---|
| 0.5 | 0 | 168 |
| 0.5 | 0.2 | 156 |
| 0.7 | 0 | 223 |
| 0.7 | 0.2 | 263 |
| 0.9 | 0 | 268 |
| 0.9 | 0.2 | 390 |
| 2 | 0 | 660 |
| 2 | 0.2 | 1305 |

However, as xanthan gum content increases, small amounts of calcium chloride rapidly increase the viscosity of the concentrated composition. This can cause the viscosity to be larger than desired for the concentrate, such concentrates intended to be dispensed into a liquid food product.

A synergistic result may occur because of the selection of the gums/thickeners as well as the specific inhibitor components. More specifically, it has been unexpectedly discovered that a synergistic result occurs when a salt, such as calcium chloride is used in combination with an oligosaccharide, such as maltodextrin. As will be described in more detail below, when an aqueous mixture of maltodextrin and calcium chloride are used, the combination surprisingly exerts a strong hydration inhibitory (viscosity) effect on gums, such as xanthan gum. By using such combination, liquid gum concentrates, such as xanthan gum can be prepared that have great fluidity and pourability. When these concentrates are then diluted, the inhibition effects are diluted, permitting the gums to affect an increase in viscosity at certain dilutions.

The synergistic inhibition effect is demonstrated in FIG. 3. More specifically, various compositions were prepared at different concentrations of xanthan gum. Each of the samples were agitated for 30 minutes at 160 rpm, 25° C. in a Rapid Visco Analyzer (RVA) canister before the viscosity was read.

A first set of samples was prepared using just xanthan gum without any inhibitors (labeled as distilled water). A second set of samples was prepared using 4.5 wt. % calcium chloride. A third set of samples was prepared using 45 wt. % maltodextrin having a DE of 15. Finally, a combination of inhibitors was used in a set of samples with both 4.5 wt. % calcium chloride and 45 wt. % maltodextrin as the inhibitors (labeled as inhibitor dispersant).

As shown in FIG. 3, xanthan gum alone, without any inhibitor components, showed increasing viscosity with increasing xanthan gum alone. At 6 wt. % xanthan gum, the sample had a viscosity around 2500 cp. Each of the samples using either maltodextrin alone or calcium chloride alone had notably higher viscosity for the sample xanthan concentrations. In fact, using 45 wt. % maltodextrin (DE of 15), the viscosity increased rapidly such that only a maximum of 2 wt. % xanthan was tested. Similarly, using 4.5 wt. % calcium chloride, the viscosity increased to over 3500 cp at 4 wt. % xanthan gum.

However, when a combination of 45 wt. % maltodextrin (DE 15) and 4.5 wt. % calcium chloride were used in combination, the viscosity was decreased for all xanthan gum concentrations. For instance, at 2% xanthan gum, the viscosity was reduced from 660 cp (with no inhibitors) to 130 cp by using this inhibitory mixture of maltodextrin and calcium chloride. In these samples, xanthan concentrates were prepared with up to 10% xanthan gum and remained with good fluidity.

The synergy between calcium chloride salt and maltodextrin is surprising. Calcium chloride would be expected to interact with maltodextrin, but instead inhibits xanthan to an extent such that syrup-like concentrates can be made with a high percentage of xanthan. Maltodextrin contains hydroxide groups, and it would be expected that the interaction between the salt and maltodextrin might limit the ability of maltodextrin to interact with xanthan gum. Instead, a synergy was observed such that a mixture of xanthan gum, salt, and maltodextrin is much less viscous initially than either a mixture of xanthan gum and salt or a mixture of xanthan gum and maltodextrin. Further, since both samples with only one of calcium chloride and maltodextrin had increased viscosity compared to the xanthan gum without any inhibitors, it would be expected that the combination of calcium chloride and maltodextrin would still have a higher viscosity than xanthan gum alone. Upon review of the above, it is hypothesized that a divalent cation, such as calcium, "bridges" xanthan gum on its anionic functional groups to form a complex. The complex is reinforced in a way that resists water and other hydrophilic molecules from penetrating and acting as plasticizers. In the remaining liquid phase, maltodextrin outcompetes xanthan gum for available hydrating water.

When used together, calcium chloride or other salt can be used in an amount of about 0.1 to about 10 wt. %, in some cases, an amount of about 1 to about 10 wt. %, by total weight of the liquid thickener composition, and the maltodextrin or other oligosaccharide can be used in an amount of about 2 to about 55 wt. %, in some cases, an amount of about 10 to about 55 wt. % by total weight of the liquid thickener composition. For instance, the lower range value for the salt may be about 0.1%, about 0.5%, about 1.0%, about 1.5%, about 2%, about 2.5%, about 3%, about 3.5%, or about 4%, and the higher range value for the salt may be about 7%, about 8%, about 9%, or about 10%, by total weight of the liquid thickener composition. For instance, the lower range value for the oligosaccharide may be about 2%, about 3%, about 4%, about 5%, about 6%, about 7%, about 8%, about 9%, or about 10%, and the higher range value for the oligosaccharide may be about 45%, about 50%, or about 55%, by total weight of the liquid thickener composition. The ratio of maltodextrin or other oligosaccharide to calcium chloride or other salt generally can be between 10:1-200:1, depending on the desired degree of inhibition and salt tolerance.

As described in more detail below and supported by the examples, calcium chloride can be used with other low viscosity poly- and oligo-saccharide containing materials. For example, gum arabic may be used.

Figure 3:
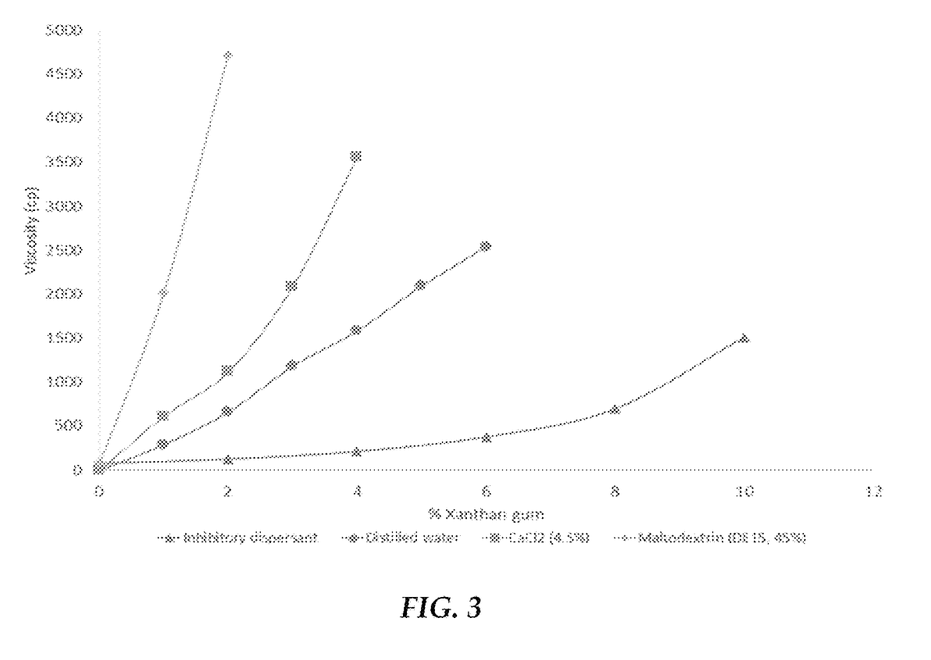
FIG. 3 is a graph of viscosity of xanthan gum in various mixtures of materials.

In view of this, concentrated liquid thickener compositions can be made whereby the viscosity of the combined concentrate is less than the viscosity of the gum or thickener without any inhibitor components. In view of the data and results presented in FIG. 3, the composition may contain 1-20 wt. % xanthan, 2-55% maltodextrin (such as 10-55%), and 0.1-10 salt (such as 1-10 wt. %). Additional gums, such as gellan gum may also be used to decrease and/or prevent xanthan gum from settling. For example, less than about 0.1 wt. % gellan gum may be used.

The liquid thickener compositions may be made in a variety of manners by combining the various components together. The stability of the gum may be increased by performing various heating and cooling cycles.

For example, the stability of xanthan gum concentrate can be further improved by a "heat-cool-heat" process with a trace amount of gellan gum added beforehand. The purpose of first heating is to completely hydrate a small amount of gellan gum. For instance, the concentrate may be first heated to an elevated temperature by which is contemplated a temperature of at least 50° C. and preferably a temperature of at least 80° C. Maltodextrin can then be added while the mixture is hot and then the mixture is cooled to a relatively lower temperature (e.g., 25° C.) to set a weak fluid gel before calcium chloride and xanthan gum are incorporated. After xanthan addition, the concentrate can be safely heated again without developing excessive viscosity. A further heating and cooling cycle may be used to reduce the microbial load of the concentrate. For packaging, a hot filling operation may be employed.

After the concentrate is prepared, the concentrated composition may then be diluted. For typical food product use, one part concentrate may be used with 5 to 20 parts liquid food. Exemplary foods products that may be used with the compositions described herein include for example water, juices, dairy products, soft drinks, soups, gravies, coffees, alcoholic beverages, and the like.

In industrial applications, the dilution rate may be one part concentrate to 2 to 4 parts of liquid if the added salt is tolerated in such application.

The following nonlimiting Examples are provided for illustration.

Example 1

A thickener composition in the form of a concentrate can be prepared using 9 wt. % xanthan inhibited with 45% maltodextrin plus 4.5% calcium chloride.

For 9 wt. % xanthan in plain water, it would not be possible to make a uniform solution/mixture using standard mixing because the viscosity is too high. Even if attempted with extreme high shear, measuring the viscosity would be very challenging. However, when the above inhibitory components are applied, 9% xanthan produces a free-flowing liquid that is less thick than honey.

Such a concentrate may be especially suitable for food thickener uses because it provides 0.45% to 0.9% xanthan after 20× to 10× dilution, which is typical xanthan usage in most applications. Xanthan's viscosity is negatively affected by salt at less than 0.5% xanthan concentration, but is positively boosted at greater than 0.5% xanthan (as discussed above in Table 1). Additionally, at 9 wt. % xanthan, the composition is such that the xanthan concentration does not require too much calcium chloride. The salty taste of calcium chloride may be a limiting factor for food applications and therefore, desirably is to be low in the concentrate.

Figure 4:
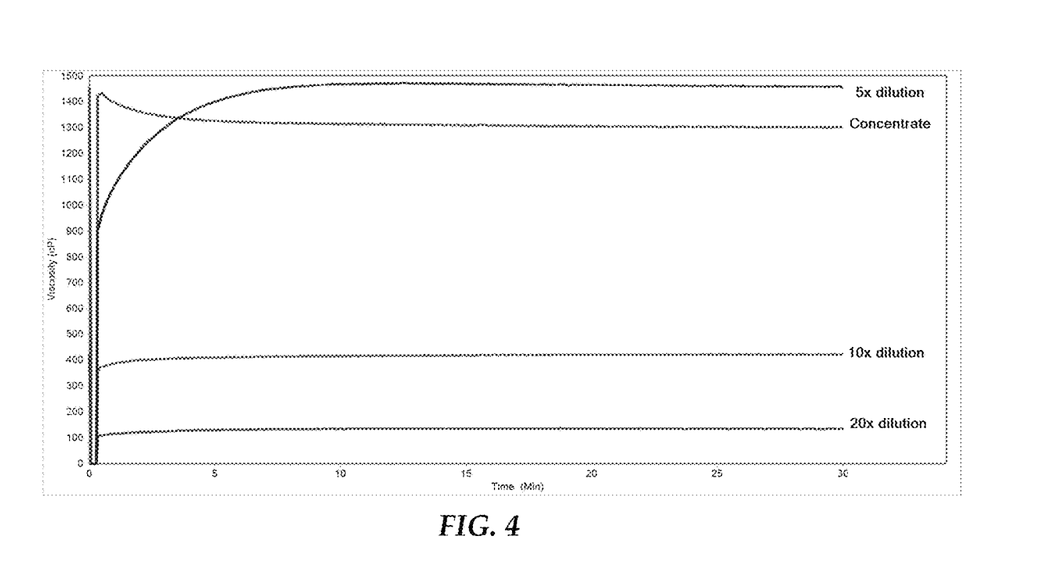
FIG. 4 is a graph of viscosity of various dilutions of one form of xanthan gum concentrate over time.

A composition was prepared per the above, then diluted in water at different dilutions and the samples were each agitated for 30 minutes at 160 rpm, 25° C. in a Rapid Visco Analyzer (RVA) canister before the viscosity was read. As shown in FIG. 4, the viscosity of the undiluted concentrate was approximately 550 cp, while the viscosity at 5×, 10×, and 20× dilutions are 1002, 319, and 143 cp, respectively.

Example 2

Example 2 illustrates one representative method for preparing a liquid thickener composition including gums/thickeners along with hydration inhibitors. First, gellan gum is added to distilled water and heated to 90° C. Maltodextrin is dissolved in the hot gellan solution and cooled to 30° C. to set a weak gellan gel. Next, calcium chloride and lactic acid are dissolved in the cooled solution. Xanthan gum is then added to the solution and stirred until no lumps are observed. Finally, the solution is reheated to 90° C. and held for 10 minutes to sterilize the contents. The solution can then be hot filled into a sterile container.

Following the above, a composition was prepared. The weight percentages of the composition ingredients are shown below in Table 2.

TABLE 2

| Ingredient | % of total composition weight |
| --- | --- |
| Water | 53.18 |
| Maltodextrin (M150) | 40.95 |

TABLE 2-continued

| Ingredient | % of total composition weight |
|---|---|
| Xanthan Clear Powder | 9 |
| Calcium chloride | 4.1 |
| Lactic acid | 0.1 |
| Gellan gum | 0.025 |

The above concentrated material was then diluted to various dilutions with tap water and stirred gently with a spoon for 60 seconds. The concentrated composition was readily dispensed into water and formed a desirable thickened liquid at the various dilutions.

Examples 3-8

Gum arabic can be a lone inhibitor to xanthan gum. Examples 3-5 demonstrate that the viscosity of 9% xanthan gum concentrates is negatively related to gum arabic usage. As Example 6 and 7 show, when combined with a moderate amount of calcium chloride, the viscosity of xanthan gum concentrate reduced significantly. Further incorporation of 20% maltodextrin added further synergy to the existing gum arabic and calcium chloride mixture. As shown by Examples 5 and 8, gum arabic can be used in conjunction with maltodextrin and calcium chloride system. A 20% maltodextrin and 2% calcium chloride mixture has about the same inhibitory power as a 15% gum arabic. This offers the possibility to replace gum arabic in whole or part for inhibited xanthan gum concentrates.

It was also found that the physical stability is enhanced by using a mixture of gum arabic, maltodextrin, and calcium chloride. As mentioned above, a maltodextrin and calcium chloride inhibited xanthan concentrate shows phase separation as xanthan gum slowly settles to the bottom, unless a gellan gum is used to stabilize the system. Similarly, xanthan gum shows phase separation in a gum arabic inhibited concentrate. However, instead of settling, xanthan gum flows to top and creates a clear liquid layer at the bottom. Settling of particles follows Stoke's law. By using both maltodextrin and gum arabic with calcium chloride, the density of liquid can be averaged and become close to the density of xanthan gum particles, thereby leading to reduced phase separation.

Examples 3-9 were prepared in accordance with the following table.

TABLE 3

| Example | % Gum arabic | Calcium chloride | Maltodextrin | Concentrate viscosity (cp) |
|---|---|---|---|---|
| 3 | 10 | 0 | 0 | 4254 |
| 4 | 20 | 0 | 0 | 2060 |
| 5 | 25 | 0 | 0 | 1400 |
| 6 | 20 | 1 | 0 | 1399 |
| 7 | 20 | 3 | 0 | 780 |
| 8 | 10 | 2 | 20 | 1250 |

Example 9

A solution of commercially available 10 DE maltodextrin at approximately 10% solids is provided. In a fractionation process, this solution is passed through a dialysis membrane with a 3500 MW cutoff. This process partially separates the maltodextrin based on molecular weight. Prior to fractionation, the DP profile of the 10 DE maltodextrin shows those components in the range of DP1-DP6 are present in an amount of about 21% by weight on a dry solids basis. After fractionation to remove some of the lower molecular weight components, the resulting maltodextrin has DP1-DP6 saccharide components present in an amount of about 8% by total dry saccharide weight. This fraction has different viscosifying characteristics and a reduced sugar content compared to the starting maltodextrin, and is suitable for use in the compositions described herein.

Comparative Example 1

The composition of Comparative Example 1 was obtained as a commercially available thickener under the name SimplyThick®. Based on the labelling, Comparative Example 1 included water, soluble fiber, xanthan gum, glucono delta-lactone, gellan gum, potassium sorbate (preservative), calcium chloride, citric acid, sodium citrate, guar gum, and pectin. The composition of Comparative Example 1 did not include maltodextrin.

It is believed that this material is a xanthan gum concentrate solely inhibited by acid-hydrolyzed and protein-removed gum arabic. The percentage of gellan gum of this product is less than 0.1% and so is the calcium chloride. At such low usage level, calcium chloride does not show synergy to xanthan gum inhibition. Calcium ions are well known for inducing gelation in anionic gelling hydrocolloids. It is hypothesized that the sole function of calcium chloride in this material is to serve as gelation enhancer for gellan gum and pectin. The viscosity of this composition reduced about 15% over a period of 6 months storage at room temperature.

Figure 5:
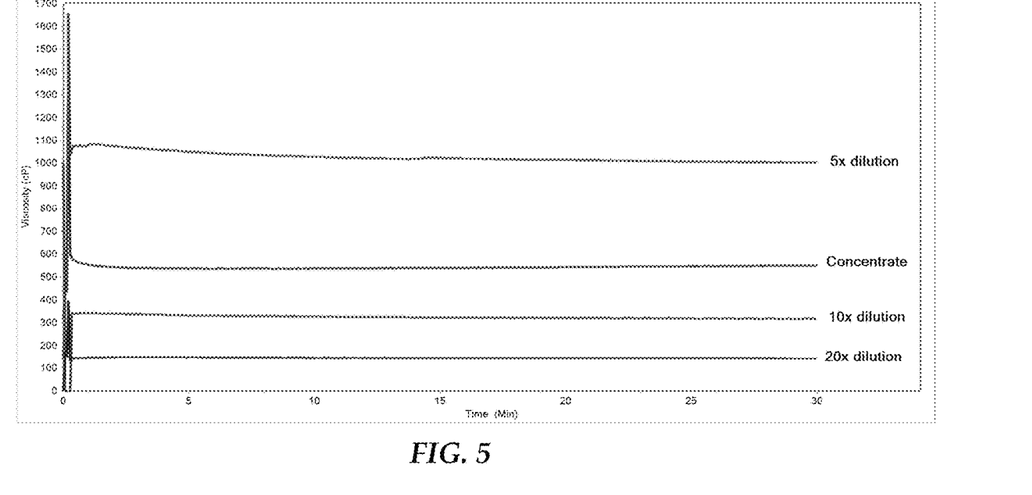
FIG. 5 is a graph of viscosity of various dilutions of a Comparative Example xanthan gum concentrate over time.

As shown in FIG. 5, the viscosity of Comparative Example 1 concentrate is 550 cp, while the viscosity at 5×, 10×, and 20× dilutions are 1002, 319, and 143 cp, respectively (all referring to the initial viscosity before storage). The samples were each agitated for 30 minutes at 160 rpm, 25° C. in a Rapid Visco Analyzer (RVA) canister before the viscosity was read Although many of the uses of the compositions described herein may be for thickening foods, the compositions may also be used with other compositions and for other uses. For example, the compositions herein may be used for drill fluids, cosmetic products, and the like.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A liquid food thickener composition comprising:
   water;
   a swelling gum in an amount of about 1 to about 20 wt. %; and
   a swelling inhibitor comprising a salt and an oligosaccharide,
   the salt and the oligosaccharide each being present in an amount that decreases swelling of the swelling gum such that a viscosity of the liquid food thickener composition is less than a viscosity of a comparative combination of the swelling gum and either one of the salt and the oligosaccharide alone when at same concentrations, and a viscosity of the swelling gum without the swelling inhibitor is less than the viscosity of the comparative combination of the swelling gum at same concentration and either one of the salt and the oligosaccharide alone.

2. The composition of claim 1 wherein the oligosaccharide includes maltodextrin in an amount of about 2 to about 55 wt. % of total weight of the liquid thickener composition.

3. The composition of claim 1 wherein the oligosaccharide includes maltodextrin in an amount of about 10 to about 55 wt. % of total weight of the liquid thickener composition.

4. The composition of claim 2 wherein the maltodextrin has a dextrose equivalent (DE) of about 10 to about 20.

5. The composition of claim 2, wherein an amount of DP1 through DP6 saccharides is at most about 8% by total saccharide weight on a dry solids basis.

6. The composition of claim 1 wherein the swelling gum includes xanthan gum.

7. The composition of claim 6 further comprising gellan gum.

8. The composition of claim 1 wherein the salt includes calcium chloride in an amount of about 0.1 to about 10 wt. % of total weight of the liquid thickener composition.

9. The composition of claim 1 wherein the oligosaccharide and the salt are provided in a ratio of about 10:1 to about 200:1 by weight.

10. The composition of claim 1 further comprising gum arabic.

11. A method of thickening an aqueous food composition, the method comprising the steps of:
    providing the aqueous food composition; and
    adding a liquid food thickener composition, the liquid food thickener composition comprising water, a swelling gum, and a swelling inhibitor, the swelling inhibitor including a salt and an oligosaccharide,
    the salt and the oligosaccharide each being present in an amount that decreases swelling of the swelling gum such that a viscosity of the liquid food thickener composition is less than a viscosity of a comparative combination of the swelling gum and either one of the salt and the oligosaccharide alone when at the same concentrations, and a viscosity of the swelling gum without the swelling inhibitor is less than the viscosity of the comparative combination of the swelling gum at same concentration and either one of the salt and the oligosaccharide alone.

12. The method of claim 11, said oligosaccharide being maltodextrin in an amount of about 2 to about 55 wt. % of total weight of the liquid thickener composition.

13. The method of claim 11, said oligosaccharide being maltodextrin in an amount of about 10 to about 55 wt. % of total weight of the liquid thickener composition.

14. The method of claim 13, said maltodextrin having a dextrose equivalent (DE) of about 10 to about 20.

15. The method of claim 11, said swelling gum including xanthan gum.

16. The method of claim 11, further comprising adding gellan gum.

17. The method of claim 11, further comprising adding gum arabic.

18. The method of claim 11, said adding comprising adding the salt in an amount of about 0.1 to about 10 wt. % of total weight of the liquid thickener composition, the salt including calcium chloride.

19. The method of claim 11, said adding comprising adding the oligosaccharide and the salt in a ratio of about 10:1 to about 200:1 by weight.

* * * * *